US012617431B1

(12) United States Patent (10) Patent No.: US 12,617,431 B1
Besson et al. (45) Date of Patent: May 5, 2026

(54) RISK DETERMINATION FOR AUTONOMOUS VEHICLE SIMULATIONS

(71) Applicant: Zoox, Inc., Foster City, CA (US)

(72) Inventors: Clement Besson, San Francisco, CA (US); Jonathan Philip Wai Wah Chan, San Francisco, CA (US); Gary Linscott, Seattle, WA (US); Nathan David Shemonski, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 447 days.

(21) Appl. No.: 17/957,833

(22) Filed: Sep. 30, 2022

(51) Int. Cl.
B60W 60/00 (2020.01)
B60W 30/095 (2012.01)

(52) U.S. Cl.
CPC .... B60W 60/0015 (2020.02); B60W 30/0953 (2013.01); B60W 30/0956 (2013.01); B60W 2510/0638 (2013.01); B60W 2510/18 (2013.01)

(58) Field of Classification Search
CPC ......... B60W 60/0015; B60W 30/0953; B60W 30/0956; B60W 2510/0638; B60W 2510/18; G06F 30/20
See application file for complete search history.

(56) References Cited

U.S. PATENT DOCUMENTS

| | | | | |
|---|---|---|---|---|
| 10,222,228 B1 * | 3/2019 | Chan | ..................... | G06F 3/0481 |
| 11,648,962 B1 * | 5/2023 | Crego | ..................... | G08G 1/166 |
| | | | | 701/26 |
| 11,970,164 B1 * | 4/2024 | Havlak | ........... | B60W 60/00272 |
| 12,139,133 B1 * | 11/2024 | Schleede | ............... | B60W 50/06 |
| 2006/0224289 A1 * | 10/2006 | Kiribayashi | ............ | B60R 21/34 |
| | | | | 701/45 |
| 2018/0147988 A1 * | 5/2018 | Lee | ...................... | G08G 1/0133 |
| 2018/0267538 A1 * | 9/2018 | Shum | .................... | B60W 30/09 |
| 2018/0308000 A1 * | 10/2018 | Dukatz | .................. | G06N 10/60 |
| 2019/0354643 A1 * | 11/2019 | Shum | ..................... | G06F 30/20 |
| 2020/0272164 A1 * | 8/2020 | Gray | .................... | G06F 18/2178 |
| 2020/0331463 A1 * | 10/2020 | Diamond | ........... | B60W 30/085 |
| 2021/0101624 A1 * | 4/2021 | Philbin | ................. | G06F 18/251 |
| 2022/0242401 A1 * | 8/2022 | Thompson | ............... | G06F 1/14 |

FOREIGN PATENT DOCUMENTS

| | | | | | |
|---|---|---|---|---|---|
| CN | 112464462 A | * | 3/2021 | ............ | G06F 30/20 |
| CN | 113505446 A | * | 10/2021 | | |
| GB | 2605991 A | * | 10/2022 | ............ | G06N 3/006 |

* cited by examiner

*Primary Examiner* — Justin S Lee
(74) *Attorney, Agent, or Firm* — EIP US LLP

(57) ABSTRACT

System, methods, and computer-readable media for determining metrics associated with simulations of proximity events within autonomous vehicle simulations. In some examples, a simulation may be created using driving log data from an autonomous vehicle. Portions of the simulation containing proximity events may be analyzed. Intent times for both the autonomous vehicle and agent vehicles within the simulation may be determined, and the deceleration required for each vehicle to avoid the proximity event may be calculated. These decelerations may be used to determine metrics for the likeliness of the proximity event and the avoidability of the proximity event by the autonomous vehicle. These metrics may be used to prioritize development tasks, assess performance of the simulation, and assess performance of vehicle control systems.

20 Claims, 7 Drawing Sheets

RISK DETERMINATION FOR AUTONOMOUS VEHICLE SIMULATIONS

BACKGROUND

As autonomous vehicles with varying levels of automation have become more widely implemented, manufacturers have been developing, testing and analyzing the systems used in such vehicles. In particular, tests are performed to determine a risk of undesirable interactions between autonomous vehicles and other vehicles in the surrounding environment. As scenarios involving undesirable interactions between vehicles cannot be accurately tested in reality without significant risk of injury and damage, simulated environments have been deployed to simulate these scenarios in the real world.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
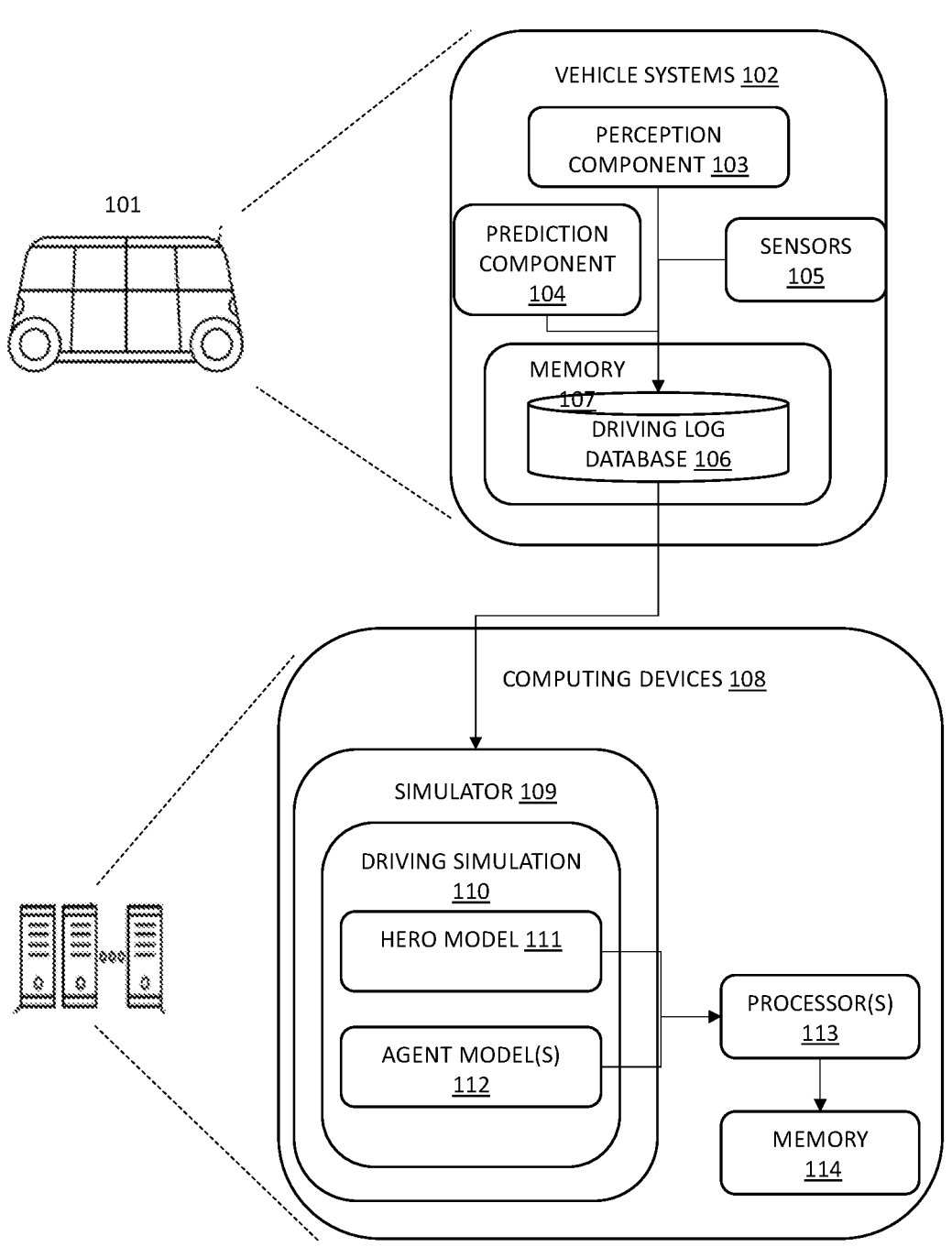
FIG. 1 is a diagram illustrating a process for determining metrics representative of risk in simulations of autonomous vehicle driving.

This application relates to methods, systems and computer-readable media that can be used to assess proximity event scenarios determined during simulations of an autonomous vehicle traversing an environment. Due to limitations of the simulations, which will be exemplified later, simulations of the autonomous vehicle that result in a proximity event, where two or more vehicles get closer to each other than a desired threshold distance such as in a proximity event, may or may not represent realistic proximity event scenarios. For example, some proximity events may have been very easily avoidable in a real-world scenario and occur due to limitations in the simulations ability to represent real driver behavior. In various examples described herein, simulations of interactions between an autonomous 'hero' vehicle and one or more external 'agent' vehicles are assessed using metrics that are representative of aspects of how likely a proximity event between the two entities would have been in real life.

A 'hero' vehicle may be an autonomous vehicle that is controlled in the simulation by software and/or hardware components. Accordingly, the 'hero' vehicle may react differently when changes in software and/or hardware components are applied and a simulation is re-run. An 'agent' vehicle may represent a vehicle controlled external to the system described herein, such as by a human driver. The behavior of the 'agent' vehicle may have been recorded in a real driving scenario and recorded in log data. The behavior for a hero vehicle may therefore change across multiple simulations based on a particular set of log data representing a particular scenario, as the hero may react differently when different software or hardware parameters are simulated, while behavior relating to an agent vehicle obtained from the log data may not change or may change in a more limited manner, as the behavior of the agent vehicle is determined based on historical log data.

Metrics may be computed for the likeliness of the proximity event—this being representative of the deceleration that would be required for an agent vehicle to avoid the proximity event at a given time—and the avoidability of the proximity event, representative of the ability of the hero vehicle to avoid the proximity event at a given time. It is expected that the lower the likeliness metric, the less likely the proximity event is to occur in real-world driving scenarios. Similarly, the avoidability metric may be used to identify scenarios that are more important for an artificial intelligence implementation, such as might control an autonomous vehicle, to address. Over multiple iterations of a simulation, the evolution of a given metric for a given simulated scenario may be examined with different versions of the artificial intelligence implementation to identify whether likelihood of a proximity event is being reduced and to identify more important incidents (those that are more likely to occur in the real world) to study and focus on. Either the likeliness or avoidability metric, or a combination of both, may be used to identify a given proximity event within a scenario as being avoidable or unavoidable. Simulated scenarios may be ranked according to either the likeliness or avoidability metric, and such rankings may provide an indication of the priority of addressing the scenario in question when considering development tasks.

In examples, a real-world vehicle, which may be an autonomous vehicle, travelling through a real-world environment, may capture or gather data using one or more sensors. Additional data may be generated from further components of the autonomous vehicle based on the sensor data, such as through localization, perception and planning components. The localization component may record information about the vehicle's location at different times. The perception component may comprise a camera or other sensor systems (e.g., vision, lidar, radar, time of flight, infrared, etc.) that records information about the surround environment or records data about objects recognized at different times. Data relating to a route or path taken by the autonomous vehicle through an environment may be recorded in data logs. An example of recording vehicle data by vehicle systems in data logs is described in US.2020/0192872 which is incorporated by reference in its entirety herein for all purposes. The recorded data may comprise information regarding the geography of a given environment, objects in the environment, the location and trajectory of the autonomous vehicle, and the location and trajectory of other vehicles and entities in the environment, as well as data about the status of the vehicle such as engine speed, battery power levels etc. Any data gathered by or created by the autonomous vehicle may be utilized to create a driving log representative of the movement of the autonomous vehicle through the environment, the environment through which the autonomous vehicle has moved, and other entities within the environment.

The driving log thus generated, or a portion thereof, may then be used to generate a driving simulation. In some examples, a portion of the driving log may comprise a vehicle trip (e.g., cycle from start to stop) or a portion of a vehicle trip. In some examples, the portion of the driving log may represent a period of time that is less than a total time associated with the log. The driving simulation may reproduce the existing behavior of other vehicles and objects (e.g. pedestrians, birds, etc.) and may apply a new configuration (e.g., a software or hardware change) of the autonomous vehicle that is being tested in the simulation. In some examples, the behavior of one or more objects in the simulation may be modified using predetermined logic to react to certain changes or behaviors. Such objects that can react to the autonomous vehicle, whose driving is being simulated, are referred to herein as "smart agents".

The driving simulation may then be divided into portions. Portions of the overall simulation containing scenarios in which the simulated hero vehicle interacts with a simulated agent vehicle may be selected, in order to identify scenarios of interest that may be used to ensure that the autonomous vehicle upon which the simulation is based operates safely and predictably within a given environment. In some examples, this may comprise identifying specific events within scenarios. In some examples, such events may be occasions at which vehicles come close to each other in a 'proximity event,' which may then be assessed using metrics for likeliness and avoidability. Such a proximity event may in some examples comprise an event in which the simulated hero vehicle and the simulated agent vehicle overlap.

For each portion of the simulation, one or more intent times may be calculated for the hero vehicle and the agent vehicle. A longitudinal intent time of an entity, for a given proximity event, can be representative of the first time that the entity's speed shows intent to occupy a proximity event zone in which the proximity event may occur. The lateral intent time for an entity can be representative of the first point in time at which it is clear that the entity is going to take a path that will lead it to occupy the proximity event zone in which the proximity event may occur—in some examples, this may be the point in time at which the entity begins turning. An overall intent time for each entity is the first point in time at which the vehicle shows both longitudinal and lateral intent to enter the proximity event zone and is therefore the later of both longitudinal intent time and lateral intent time. According to some examples, the overall intent time may be calculated using either the longitudinal intent time of the entity or the lateral intent time, without requiring both.

A metric representing a likeliness of the proximity event to occur in real life may be calculated, using the overall intent time of the hero vehicle. This metric represents the difficulty posed for the agent vehicle to avoid the proximity event, determined at the hero's intent time. The avoidability of the proximity event may also be calculated, using the overall intent time of the agent vehicle. This metric represents the ability of the hero vehicle to avoid the proximity event, determined at the agent's intent time.

According to some examples, the metrics determined as described may be recorded and compared across multiple iterations of a simulation. Different versions of the control systems for the autonomous hero vehicle may be simulated, and comparison of the metrics across iterations of the simulation may provide a measure of the effects of these variations.

Accordingly, techniques (including, but not limited to, a method, a system, and one or more non-transitory computer-readable media) may be provided as discussed herein.

FIG. 1 is a schematic diagram showing components used in a workflow according to a first example. A vehicle 101 is shown—according to some examples, this may be an autonomous vehicle—that carries vehicle systems 102.

Vehicle systems 102 may comprise perception component 103, prediction component 104 and sensors 105. These systems, along with other systems not depicted in this figure, may provide information to driving log database 106.

For the purpose of illustration, vehicle 101 can be an autonomous vehicle configured to operate according to a Level 5 classification issued in 2013 by the U.S. National Highway Traffic Safety Administration, which describes a vehicle capable of performing all safety-critical functions for the entire trip, with the driver (or occupant) not being expected to control the vehicle at any time. This is merely an example, and the systems and methods described herein may be incorporated into any vehicle and/or robot, including those ranging from vehicles that need to be manually controlled by a driver at all times, to those that are partially autonomously controlled, such that they can be autonomously controlled without driver attention or assist during certain driving conditions, such as, for example, while operating on limited-access highways, but such that they require driver attention and/or assistance during other driving conditions, such as, for example, while operating on city streets in urban areas, or during at least some parking functions.

Vehicle system 102 may comprise sensors 105. In at least one example, sensors 105 may include LIDAR (Light Detection And Ranging) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), etc. Sensor system 105 may include multiple instances of each of these or other types of sensors. For instance, the LIDAR sensors may include individual LIDAR sensors located at the corners, front, back, sides, and/or top of vehicle 101. As another example, the cameras may include multiple cameras disposed at various locations about the exterior and/or interior of vehicle 101.

Vehicle systems 102 may additionally comprise a perception component 103. In at least one example, the perception component 103 can include functionality to perform object detection, segmentation, and/or classification. In some examples, the perception component 103 can provide processed sensor data that indicates a presence of an entity that is proximate to the vehicle 101 and/or a classification of the entity as an entity type (e.g., car, pedestrian, cyclist, animal, building, tree, road surface, curb, sidewalk, unknown, etc.). In additional or alternative examples, the perception component 103 can provide processed sensor data that indicates one or more characteristics associated with a detected entity (e.g., a tracked object or agent vehicle) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

A prediction component 104 may also form part of the vehicle systems 102. The prediction component 104 may be configured to generate predicted trajectories of objects in an environment. For example, the prediction component may generate one or more predicted trajectories for objects within a threshold distance from the vehicle. In some examples, the prediction component may measure a trace of an object and generate a trajectory for the object based on observed and predicted behavior. Prediction components may be configured to generate one or more probability maps representing prediction probabilities of possible locations of one or more objects in an environment. For example, the prediction component may generate one or more probability maps for vehicles, pedestrians, animals, and the like within a threshold distance from the vehicle. In some examples, the prediction component may measure a track of an object and generate a discretized prediction probability map, a heat map, a probability distribution, a discretized probability distribution, and/or a trajectory for the object based on observed and predicted behavior.

Data may be output from sensors 105, perception component 103 and/or prediction component 104 may be stored in a driving log database 106 as a part of a driving log, the driving log comprising a collection of data representative of the movement of the autonomous vehicle through the environment, the environment through which the autonomous vehicle has moved, and other entities within the environment. Driving log database 106 may be stored in memory element 107 present in vehicle systems 102—in additional or alternative examples, driving log database may be stored on memory remote to vehicle 101. Driving log database 106 may store a plurality of driving logs generated by vehicle 101, or in embodiments in which it is stored in remote memory, may store driving logs associated with further vehicles.

Vehicle systems 102 may comprise additional components not illustrated in FIG. 1. In some examples this may include a localization component configured to determine a position and/or orientation of vehicle 101 (e.g., one or more of an x-, y-, z-position, roll, pitch, or yaw). For example, the localization component may include and/or request/receive a map of an environment and can continuously determine a location and/or orientation of the autonomous vehicle within the map. In some instances, the localization component may utilize SLAM (simultaneous localization and mapping), CLAMS (calibration, localization and mapping, simultaneously), relative SLAM, bundle adjustment, non-linear least squares optimization, or the like based on image data, lidar data, radar data, IMU data, GPS data, wheel encoder data, and the like captured by the one or more sensor systems 105 or received from one or more other devices to accurately determine a location of the autonomous vehicle. Data generated by such additional components may also form part of one or more driving logs stored in driving log database 106.

Driving log data stored in driving log database 106 may be transmitted to a computing device 108. This data may be transmitted from driving log database 106 in any suitable way; in some examples this may comprise the data being provided as a continuous stream in real-time from vehicle 101 to computing device 108 while the vehicle is in motion. In other examples vehicle 101, or another device storing driving log data for vehicle 101, may transmit driving log data to computing device 108 as a packet, at predetermined time intervals, regardless of whether a journey has concluded or whether the driving log data contains data from multiple journeys. Driving log data may also be sent at the conclusion of each journey of vehicle 101. In some examples, computing device 108 may be configured to query vehicle 101 or other computing device at which the driving log data is stored, to retrieve the data. Computing device 108 may comprise a simulator 109. Simulator 109 may be configured to generate driving simulations 110 in which simulated driving scenarios are performed and data comprising simulated values for entities within the simulation may be gathered, calculated or determined. Simulation of driving scenarios may be a useful way to implement testing and validation of components and/or to generate test and learning data for models and algorithms, such as neural networks or other machine learning algorithms. According to one example, simulator 109 may be configured to generate simulation 110 based on the driving log data received from vehicle 101.

Simulation 110 may contain at least two models. A first model may be based on vehicle 101 and may be referred to as a 'hero' model 111. At least one further model may be based on external entities (such as pedestrians, animals, other vehicles) identified as present within the driving log data received from vehicle 101. These further models may be referred to as 'agent' models 112. Agent models 112 may be controlled according to an object behavior model as described in [U.S. application Ser. No. 17/743,103, "IMPROVING BEHAVIOR OF SIMULATED OBJECTS IN DRIVING SIMULATIONS" which is hereby incorporated by reference for all purposes.

Simulation 110 may be divided into portions, with those portions of the overall simulation containing scenarios in which the simulated hero vehicle interacts with a simulated agent vehicle being selected, in order to identify potential proximity events. These portions may then be used to determine metrics for likeliness and avoidability. According to a first example, this may comprise data from simulation 110, and from the relevant hero model 111 and agent model 112 for a given scenario being passed to a processor element 113. Processor element 113 may use the data from the selected portions of simulation 110, hero model 111 and agent model 112 to calculate the relevant metrics. This may comprise calculating overall intent times for both hero model 111 and a relevant agent model 112 in a given scenario, the overall intent times being a function of the speed, location and direction of the corresponding entity in the relevant scenario, as well as a predetermined metric for deceleration of the relevant entity. Processor element 113 may use this information to determine metrics for likeliness and avoidability for a given scenario.

Information relating to the location, speed, and direction of hero model 111 for the scenario may be passed to processor 113. Agent model 112 may be categorized according to a particular class of agent—according to one example, this information may be generated during the initial gathering of data by autonomous vehicle 101, with perception component 103 classifying objects in the environment. In other examples this classification may be carried out in creating the simulation or may be determined by processor 113. In examples, agent model 112 may be classified as a car, a bicycle, a large vehicle (such as a semi truck or fire truck), a motorcycle, a vehicle towing a load, an animal, an aircraft or a pedestrian—the person skilled in the art will appreciate that this list is non-exhaustive, and that other categories may be provided. Information relating to the location, speed, and direction of agent model 112, as well as the classification thereof, may be passed to processor 113.

Processor 113 may then determine the overall intent time for each of hero model 111 and agent model 112. The overall intent time for each entity may be calculated based on two respective metrics—longitudinal intent time and lateral intent time. According to a first example, both longitudinal intent time and lateral intent time may be used for this calculation. In other examples, only one of these may be required.

Longitudinal intent time of an entity may be defined as the first time the entity's speed shows intent to occupy the proximity event zone in which the proximity event may occur. This may alternatively be stated as the last point in time at which the entity may comfortably brake and avoid the proximity event. In some examples, the longitudinal intent time for an entity may be determined by re-running the simulation sequentially with the entity braking at earlier times. The longitudinal intent time is the latest time at which braking by the entity avoids the proximity event. In other examples, the longitudinal intent time may be calculated from a point in time at which the entity enters a determined proximity event zone in which a proximity event may occur, and calculating a time that the entity would have needed to being decelerating to stop at the determined proximity event zone. The approach of re-running the scenarios sequentially may be suitable for automated detection of the longitudinal intent time. The approach of defining a proximity event zone in which the proximity event occurs and automatically calculating a longitudinal intent time may be suitable for implementations in which the proximity events are manually identified and/or labelled by a user. The proximity event zone in which the proximity event occurs may be manually labelled at the time that the proximity event is manually identified. The longitudinal intent time may then be automatically calculated back from the manually labelled proximity event zone.

In determining the longitudinal intent time for an entity, the classification of the entity may be used to identify a predetermined rate of deceleration of the entity. For hero model 111, a deceleration of 2 m/s² may be used. For agent model 112, if classified as a car, a deceleration of 2 m/s² may be used. If agent model 112 is classified as a bicycle, a deceleration rate of 1 m/s² may be used, and if agent model 112 is classified as a pedestrian, a deceleration of 0.8 m/s² may be assumed. In other examples, different rates of deceleration may be selected depending on the situation.

Lateral intent time of an entity may be defined as the first point in time at which it is likely that the entity is going to take a path which leads to the proximity event zone as further described herein. According to examples, this may be the point at which an entity begins to turn from one road into another. The conditions for determining the lateral intent time may be set for different junction types or scenarios.

The lateral intent of a vehicle may be determined using any viable means of detecting an entity's intention to turn. In examples, this intent may be indicated by the entity's use of a turn signal or indicator, by the entity altering its speed in a manner inconsistent with intent to continue on a present trajectory, or by the entity initiating lateral movement. According to one example, lateral intent may be determined by an entity deviating from a predicted trajectory. In some implementations the lateral intent time may be automatically detected. In other implementations, the lateral intent time may be manually added as a label to the scenario. In some implementations the proximity event may be manually labelled. In such implementations, the manual labelling of the lateral intent time may occur at a time when a proximity event is manually labelled.

The overall intent time of an entity may be calculated as the first point in time at which an entity shows both longitudinal and lateral intent to enter the proximity event zone. This may be computed as the maximum of both the longitudinal intent time and the lateral intent time—i.e. the later of the two intent times.

For each scenario, processor 113 may determine the likeliness of a proximity event, and the avoidability of the proximity event by the hero. The likeliness of the proximity event is representative of the difficulty posed for the agent model 112 to prevent the proximity event at the overall intent time of hero model 111—the higher this metric, the more likely the proximity event is to occur. The avoidability of the proximity event is representative of the ability of hero model 111 to avoid the proximity event at the overall intent time of agent model 112—the higher this metric, the easier it will be for hero model 111 to avoid the proximity event.

The likeliness of the proximity event may be determined by first determining the overall intent time of hero model 111, as described above, using at least one of the longitudinal intent time and lateral intent time of hero model 111. Once this time has been calculated, the deceleration required from agent model 112 to stop in a proximity event zone that is the location or region of the proximity event may be computed. This may be computed based on the speed, location and direction from the agent model 112 and the location where the simulated proximity event occurred. The higher the deceleration required by the agent model to stop before the proximity event zone, in general, the harder the proximity event is for agent model 112 to avoid. To account for cases where agent model 112 is stopped—i.e. is not in motion and positioned at the site of the proximity event, and therefore has no ability to avoid the proximity event by decelerating— the required deceleration may be set to an infinitely high value. This deceleration may be used as the likeliness metric because it is assumed that the agent vehicle would not be able to avoid the proximity event. The higher the likeliness metric, the more likely the proximity event is to occur in real life because accidents that the agent can more easily avoid by relatively modest deceleration are given low likelihood values.

The avoidability of the proximity event may be determined by first determining the overall intent time of agent model 112, as described above, using at least one of the respective longitudinal and lateral intent times. Once this overall intent time has been calculated, the deceleration required from hero model 111 to stop at the location of the simulated proximity event at this time may be computed, based on the speed, direction and location of hero model 111. In situations wherein hero model 111 is stopped, and therefore has no ability to avoid the proximity event by deceleration, the required deceleration may be set to an infinitely high value. The inverse of the deceleration may then be found and used as the avoidability metric. The avoidability metric may therefore take the form of $$\text{Avoidability} = \frac{1}{\text{Hero deceleration at agent intent time}}$$

The higher the avoidability metric, the more avoidable the proximity event is by the hero. As the hero can be a representative of an autonomous vehicle, a proximity event with a high hero avoidability can be given a higher priority, as it may represent issues to be addressed in the control systems of the vehicle being simulated.

According to some examples, the likeliness metric and avoidability metric for a given scenario may both be stored in memory 114—while pictured as present within computing device 108, the person of ordinary skill in the art will appreciate that memory 114 may be a remote memory element, such as cloud-based storage. According to some examples, simulation 110 may be repeated multiple times for the same scenario, with parameters associated with hero model 111 and agent model 110 varied, and multiple sets of likeliness and avoidability metrics may be generated and stored. For example, the hero model 111 may contain logic for controlling perception of objects in the simulated environment, logic for predicting the movement of objects in the simulated environment and/or logic for controlling movement of the simulated autonomous vehicle in the simulated environment. Changes may be made to these control logic elements in the hero model 111 across different versions. In such examples, the multiple sets of metrics generated across multiple iterations of a simulation using different versions of the control logic elements may be compared to each other, in order to derive information relating to the performance of control logic elements, the effects of varying parameters associated with simulation 110 and the models contained therein, and other aspects of the simulation process. Furthermore, by examining the metrics associated with different simulated configurations of the systems of hero model 111, an assessment may be made of the suitability of a certain configuration of autonomous vehicle for use.

Either the likeliness or avoidability metric, or a combination of both, may be used to identify a given proximity event within a scenario as being avoidable or unavoidable. Simulated scenarios may be ranked according to either the likeliness or avoidability metric, and such rankings may provide an indication of the priority of addressing the scenario in question when considering development tasks.

Figure 2:
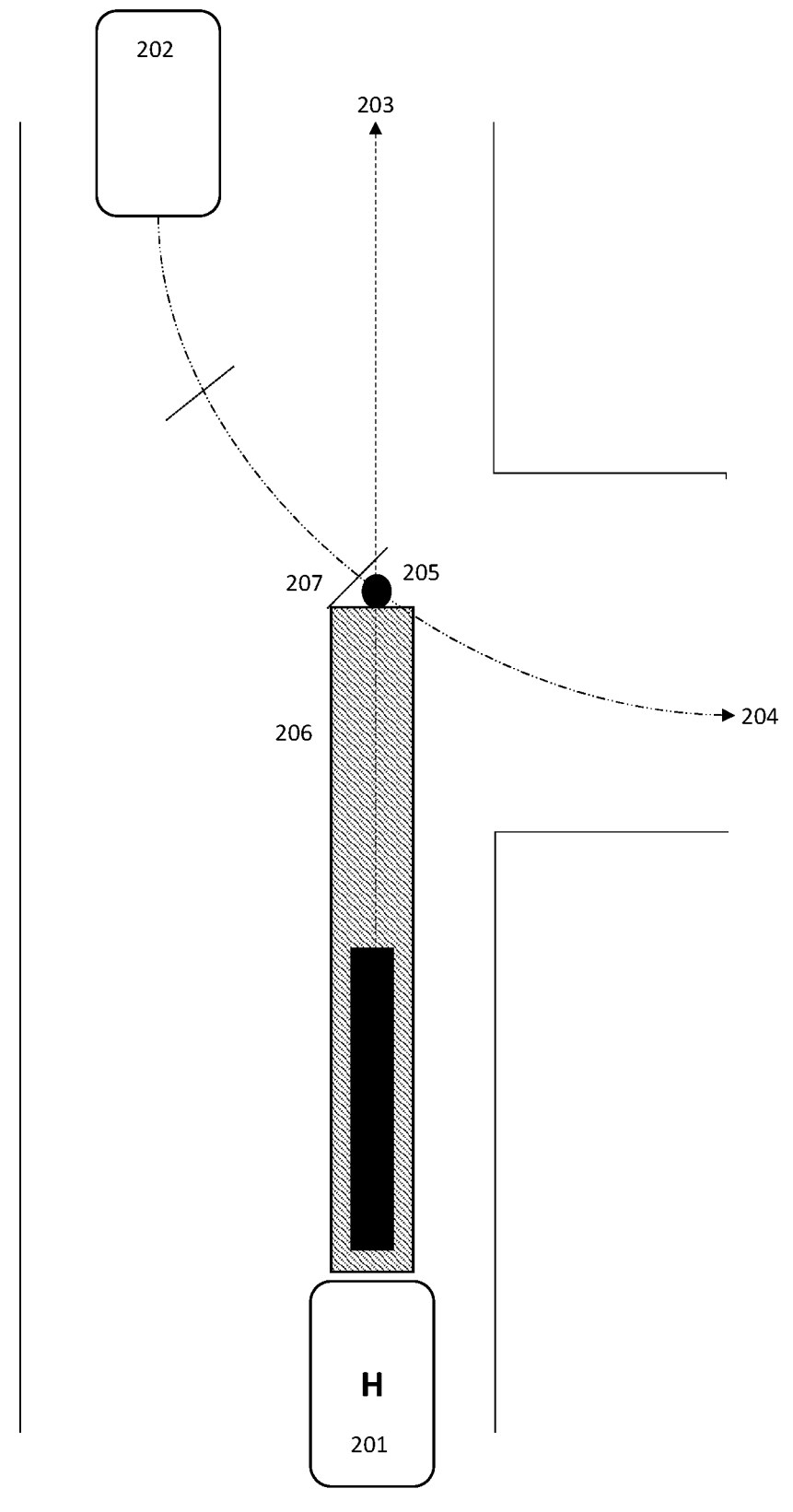
FIG. 2 is a simplified illustration of an exemplary simulated scenario depicting longitudinal intent times of simulated vehicle models.
Figure 3:
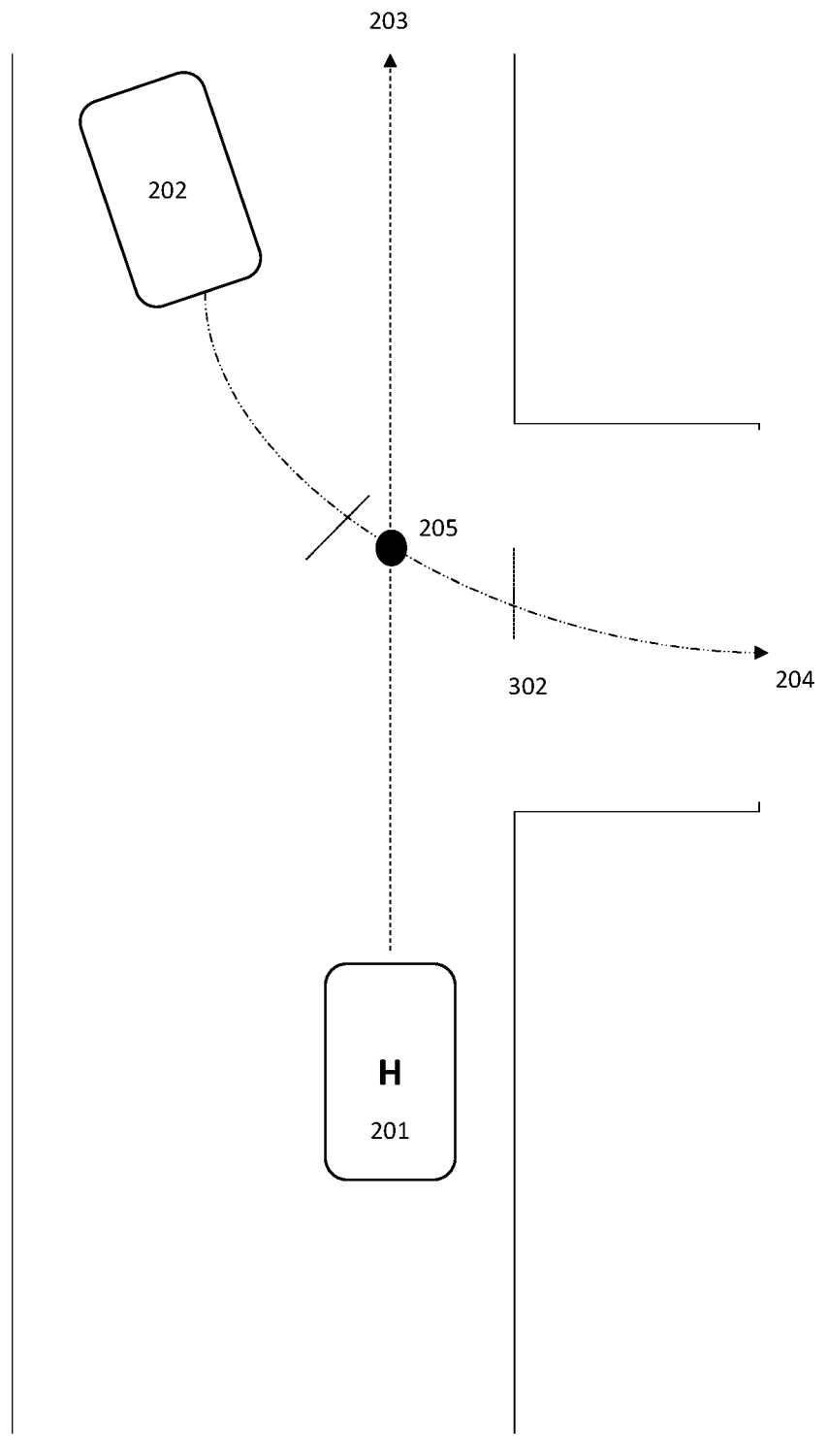
FIG. 3 is a simplified illustration of an exemplary simulated scenario depicting lateral intent times of simulated vehicle models.
Figure 4A:
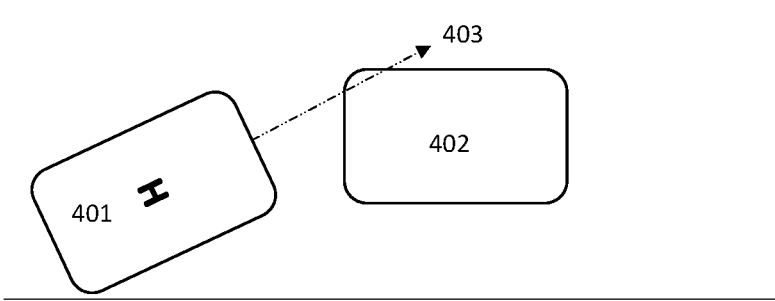
FIG. 4A-D are simplified illustrations of exemplary simulated scenarios depicting proximity event scenarios between simulated models.
Figure 4B:
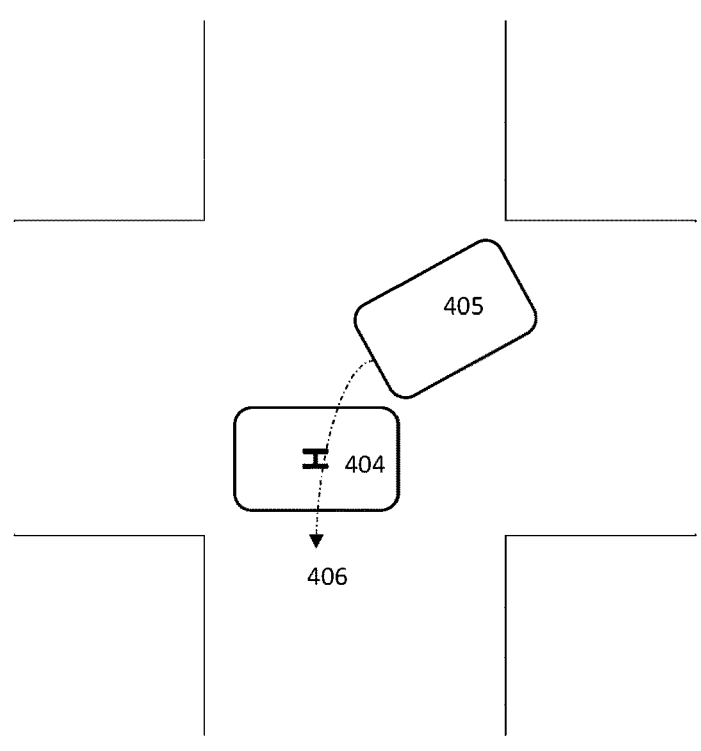
Figure 4C:
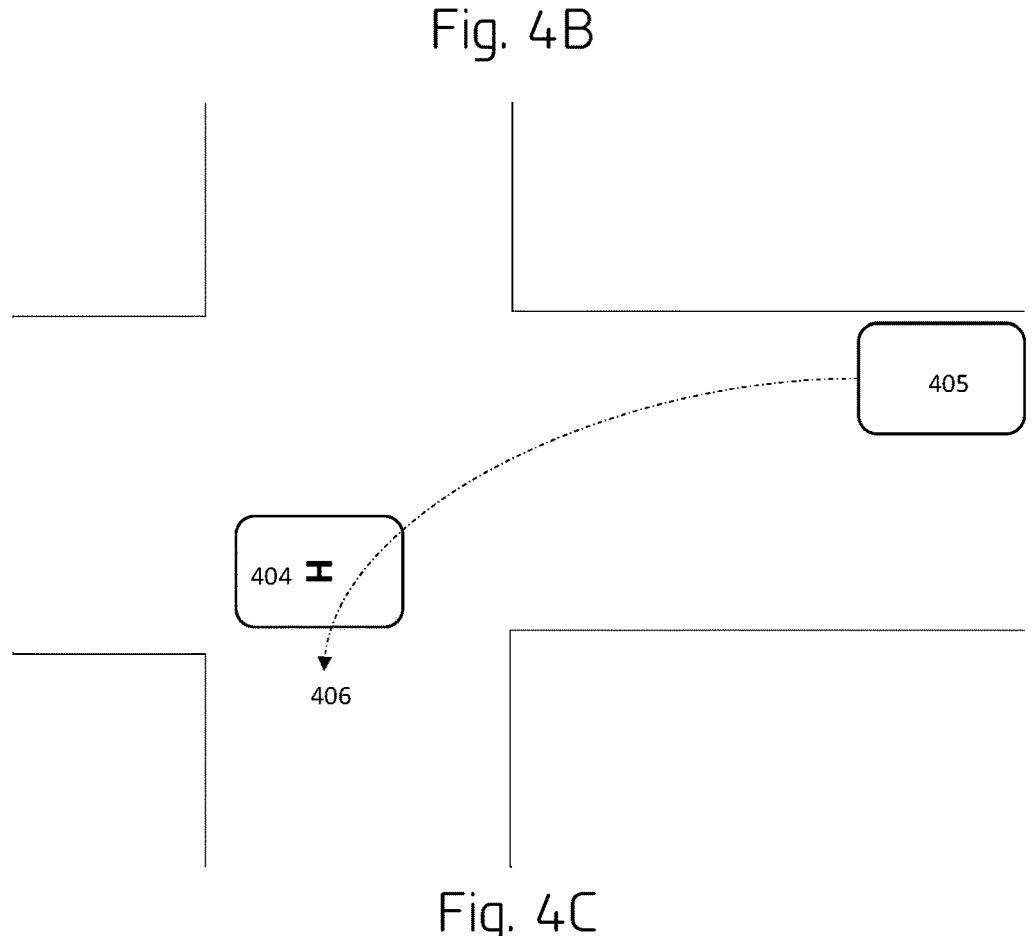
Figure 4D:
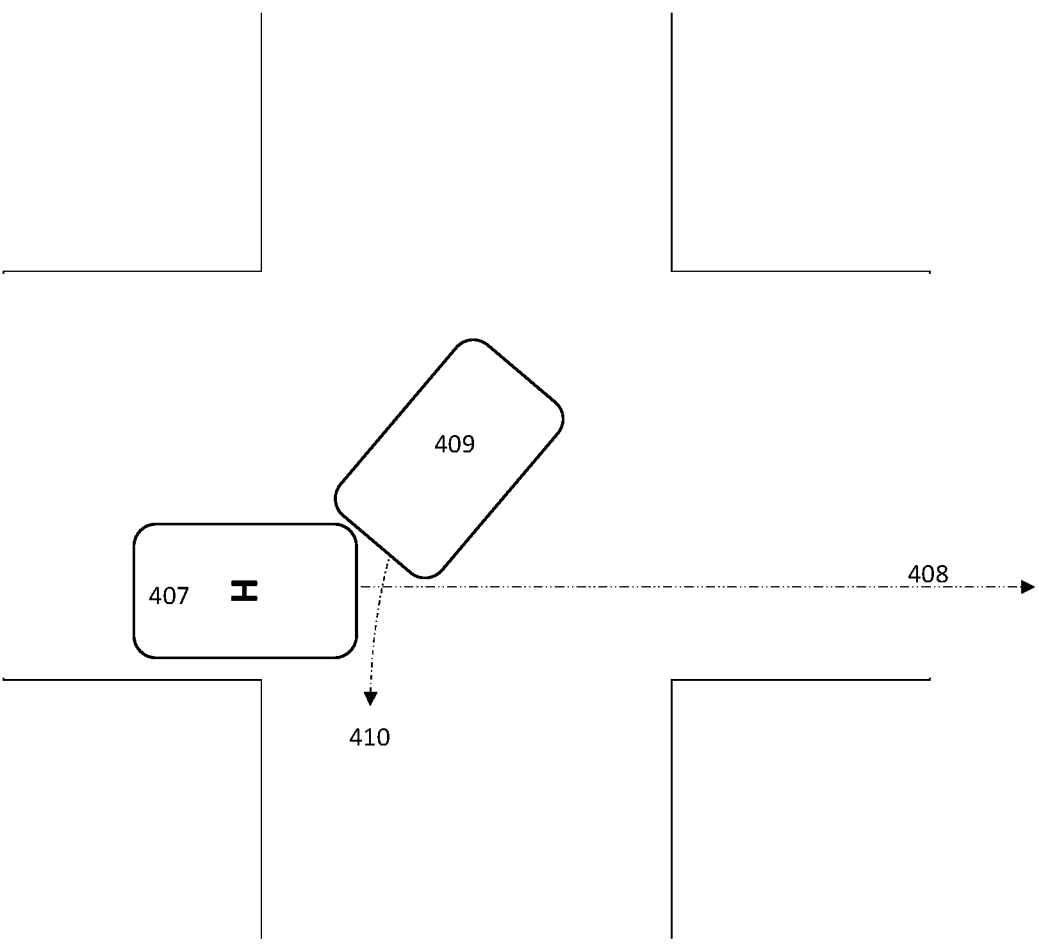

Specific examples of scenarios, and the intent times and metrics associated therewith, will now be provided. FIGS. 2 and 3 illustrate the calculation of intent times associated with entities in a portion of a simulation, while FIGS. 4A-C illustrate the calculation of the likeliness and avoidability metrics.

FIG. 2 illustrates a scenario in which hero model 201 is simulated to be travelling in a straight line along a straight road, without turning or deviating, along trajectory 203. Agent model 202, which in this instance may represent a car, is turning left relative to the direction of travel into a side road, along trajectory 204, which crosses the trajectory of hero 201. Absent action on the part of hero model 201 or agent model 202, the two models will collide in a proximity zone represented by point 205. The skilled person will appreciate that while a single point is used in FIG. 2 to illustrate the notional location of a proximity event, such a zone may extend beyond a single point and may cover a wider area.

FIG. 2 additionally shows the longitudinal intent time for both hero model 201 and agent model 202. Area 206 illustrates the comfortable stopping distance of hero model 201 along trajectory 203. As may be seen, if hero model 201 begins deceleration at the time shown in FIG. 2, it will stop just before point 205. Therefore, the position of hero model 201 shown in FIG. 2 represents the longitudinal intent time of hero model 201. Similarly, marker 207 illustrates the comfortable stopping distance of agent model 202 along trajectory 204. Therefore, if agent model 202 begins stopping at the point in time shown in FIG. 2, it will stop just before point 205. Consequently, the position of agent model 202 shown in FIG. 2 represents the longitudinal intent time of agent model 202. It should be noted that while in FIG. 2, the longitudinal intent times of hero model 201 and agent model 202 are identical, this is by way of example only, and should not be construed as indicative of a general correspondence of longitudinal intent times between entities.

FIG. 3 illustrates the same scenario—however, this figure provides the lateral intent times for each entity rather than longitudinal intent times. As stated previously, hero model 201 is travelling in a straight line along a straight road, without turning or deviating, along trajectory 203. Agent model 202, which in this instance may represent a car, is turning left relative to the direction of travel into a side road, along trajectory 204, which crosses the trajectory of hero model 201. Absent action on the part of hero model 201 or agent model 202, the two models will become close at point 205. In this particular example, as hero model 201 is moving in a straight line along trajectory 203, without turning or changing course, hero model 201 has no lateral intent time. Agent model 202 is turning left relative to the direction of travel. Lateral intent time of an entity is the first point at which it is clear that the entity is taking a path to occupy the proximity event zone—in FIG. 3, this may be represented as the first point at which agent model 201 begins to turn. Therefore, the position of agent model 202 shown in FIG. 3 may be considered the first indication that agent model 202 will take trajectory 204, thus the point in time shown in FIG. 3 may be considered the lateral intent time for agent model 202. The stopping distance 302 for agent model 202 is provided for illustrative purposes only and is not relevant for the determination of lateral intent time.

As stated above, the overall intent time for an entity is the maximum of the longitudinal intent time and the lateral intent time—this corresponds to whichever is the later point in time. In the example provided by FIGS. 2 and 3, hero model 201 has only a longitudinal intent time—the intent time of hero model 201 is therefore identical to the longitudinal intent time thereof. In the same example, agent model 202 has both a longitudinal and lateral intent time. The lateral intent time is 'later' than the longitudinal intent time—as can be seen by the progress of hero model 201 and agent model 202 along their respective trajectories 203 and 204 in FIG. 3. The overall intent time of agent model 202 is therefore the same as the lateral intent time thereof.

FIGS. 4A-C provide an illustration of how the likeliness and avoidability metrics may be calculated for example scenarios.

FIG. 4A illustrates a scenario in which hero model 401 is moving slowly along trajectory 403. Agent model 402 is parked, or otherwise immobile. As agent model 402 is immobile, it cannot avoid the proximity event by stopping—as stated above, the deceleration value for agent model 402 is therefore set to infinite. Consequently, the likeliness of the proximity event is infinite—agent model 402 cannot avoid the proximity event by decelerating. As the agent model 402 is stopped, it is already within the proximity event zone and a long/infinite time may be assumed for the intent time. Consequently, the deceleration required by hero model 401 is minimal because the hero model 401 is moving slowly and the hero model 401 has a long time to identify and avoid the agent model 402, as hero model 401 could begin stopping far away from the proximity event zone. As an example, a deceleration of 0.1 m/s² may be used—hero avoidability may therefore be calculated as:

$$\text{Avoidability} = \frac{1}{0.1 \text{ m/s}^2}$$

In practical terms, this means that the hero avoidability is very large. In short, while the proximity event described above is very likely from the perspective of agent model 402 (as it is unable to decelerate to avoid the proximity event), it is highly avoidable from the perspective of hero model 401 (as it may begin braking from far away, thus decelerating very slowly, and still avoid the proximity event). As the likeliness is high, this proximity event is likely to occur in real life. As the hero avoidability is high, this indicates that such a proximity event should be easily avoided. As the simulation has identified a proximity event this scenario may therefore represent an underlying issue in the autonomous vehicle systems being simulated, thus the priority of this scenario being addressed is high.

FIG. 4B illustrates a scenario wherein hero model 404 is nearly stopped—or moving very slowly—and agent model 405, which may be assumed to be a car, is making a sharp turn to follow trajectory 406, leading to a proximity event with hero model 404. In this scenario, as hero model 404 is almost immobile, the overall intent time for hero model 404 is the longitudinal intent time and is very high (quite a long time before the proximity event), because while not much braking is required by the hero model 404 to stop, the hero model 404 has occupied the proximity event zone, which is the junction box, for an extended period, and thus the last time at which the hero could have avoided the zone by deceleration is a substantial period before the proximity event occurs. Adopting another approach to the longitudinal intent time, if the simulation is re-run with the hero model braking at progressively earlier times, because the agent has been waiting nearly stopped in the junction for some time, the longitudinal intent time is early because that is when the hero entered the junction.

This can be seen in FIG. 4C, which illustrates hero model 404 in the junction prior to the interaction shown in FIG. 4B, with agent model 405 some distance away. Consequently, given that hero model 404 has been at or near rest in the zone for an extended period, agent model could begin decelerating a long time before the interaction, requiring only a small amount of deceleration by agent model 405 to avoid the proximity event zone. For instance, even if agent model 405 is travelling at a velocity of 8 m/s, hero 404 has occupied the zone for a sufficiently long period that the time at which it was initially on a course to occupy the zone may be as long as 30 seconds, giving a longitudinal intent time of −30. This would mean that agent model 405 could decelerate at less than a rate of 1 m/s², half the estimated decelerative ability of a car. The likeliness of this proximity event is therefore low.

In connection with avoidability, if agent model 405 makes a sudden turn, the lateral intent time of agent model 405 would be very late—perhaps as high as −0.15 (0.15 seconds before the proximity event). This would mean, if hero model 404 is moving at a relatively slow 1 m/s, that the deceleration required by hero model 404 would be very high −6 m/s². This is three times as fast as the estimated decelerative ability of a car. Consequently, the avoidability metric may be calculated as:

$$\text{Avoidability} = \frac{1}{6 \text{ m/s}^2}$$

This is a very low hero avoidability-hero model 404 would need to brake extremely hard to avoid the proximity event or may not be able to avoid it at all. As the likeliness is low, because agent model 405 has such an extended period of time in which it is likely to see that hero model 404 is in the proximity event zone, the proximity event could—in reality—be easily prevented. As the hero avoidability is low, this scenario does not indicate a likely problem in any aspect of the autonomous vehicle systems being simulated as the responsibility for this accident quite likely lies with the agent model, thus the priority for this scenario being addressed is low. In some examples, wherein the likeliness of a proximity event may be below a predetermined threshold value, such a scenario may be filtered out of any ranking or prioritization list generated to identify important development tasks. This threshold may be applied automatically, with scenarios with a low likeliness score (indicating that the scenario is not likely to happen in the real world) automatically being removed from such consideration.

FIG. 4C illustrates a situation in which hero model 407 is travelling along a straight trajectory 408. In this scenario, it will be assumed that hero model 407 is travelling at a velocity of 6 m/s and has an overall intent time of −3 (3 seconds before the proximity event). Agent model 409 is following trajectory 410, turning across the path of hero model 407. It will be assumed that agent model 409 is classified as a car, and is travelling at 9 m/s, with an overall intent time of −2 (2 seconds before the proximity event) because the agent model 409 turns 2 second before arriving at the proximity event zone.

In this scenario, the hero model 407 needs to slow from 6 m/s at the agent intent time of 2 seconds resulting in a deceleration of 3 m/s². The agent needs to deceleration from 9 m/s in 3 seconds at the hero intent time again resulting in a deceleration of 3 m/s². As each entity has an estimated comfortable decelerative capability of 2 m/s², the required deceleration would be moderately hard—not comfortable, but not very aggressive. The likeliness metric may therefore be calculated as 3 m/s², and the avoidability metric may be calculated as $$\text{Avoidability} = \frac{1}{3 \text{ m/s}^2}$$

Both of these metrics are medium—the scenario is somewhat likely to occur in real life, as the likeliness is medium, and the priority of addressing this scenario is likewise medium, as the avoidability is moderate.

According to a further embodiment, the likeliness metric or metrics and avoidability metric or metrics computed for a given scenario or set of scenarios may both be stored in a database or memory element. The simulation, portioning, and metric computation processes may be repeated multiple times, with parameters associated with the relevant hero model(s) and agent model(s) being varied. This may yield multiple sets of likeliness and avoidability metrics for each scenario, which may be stored in the database as described. In such examples, the multiple sets of metrics generated across multiple iterations of a simulation may be compared to each other, in order to derive information relating to the performance of different control systems being simulated, the effects of varying parameters associated with the simulation and the models contained therein, and other aspects of the simulation process.

The likeliness and avoidability metrics generated according to the method described may be leveraged for a variety of tasks relating both to the simulation of autonomous vehicle driving, and to the systems of the vehicle itself.

According to examples, the likeliness metric may be used to filter events and scenarios when prioritizing development tasks. In such examples, scenarios may be ranked according to the value determined for the likeliness metric, to create a ranked list of scenarios according to priority of development tasks associated therewith A scenario with a high likeliness metric means that the scenario is very likely to occur in the real world, and consequently may be flagged as more important to address from a development standpoint-if the event is more likely to occur in practice, it is more important that changes are made to deal with such events. In contrast, a low likeliness metric indicates that the scenario is unlikely to occur in the real world and may therefore be assigned a lower priority. In some embodiments, a threshold likeliness score may be used, such that any event and/or scenario with a likeliness score below the threshold value will be filtered out, and not assigned as a development task—this would mean that tasks concerning situations with only the smallest possibility of ever occurring in the real world will not consume undue time and resources.

According to further examples, the avoidability metric may be used to determine the priority of development tasks relating to each scenario and/or event. In such examples, scenarios may be ranked according to the value determined for the avoidability metric, to create a ranked list of scenarios according to priority of development tasks associated therewith. A scenario with a high avoidability metric may indicate that the autonomous vehicle should have easily avoided any proximity event, thus the fact that the proximity event occurred may indicate a flaw in the systems used to control and direct the autonomous vehicle. The higher the avoidability metric, the greater the disparity between desirable behavior (i.e. avoiding proximity events) and exhibited behavior (i.e. risking proximity events) of the autonomous vehicle. The greater the disparity, the more risk posed to the autonomous vehicle (and any occupants thereof)—and therefore the greater the need to address the scenario. In contrast, a low avoidability score may represent a practically unavoidable proximity event, that no amount of development of a control system could avoid (such as an agent vehicle crashing into a parked autonomous vehicle).

In further examples, proximity events may be classified as avoidable or unavoidable based on either the avoidability metric, the likeliness metric, or a combination of the two. A proximity event may be classified as avoidable if it has above a first threshold value for the avoidability metric and above a second threshold value for the likeliness metric. This classification may allow the selection of specific scenarios and/or data for use in the training of machine learning models used in the components that control the autonomous vehicle. For example, if an avoidable proximity event occurs in connection with a scenario involving bad weather, the sensor data from the log data associated with that scenario may be used to train a machine learning model in a perception component of the autonomous vehicle with a view to improving object recognition in similar scenarios.

In a further example, scenarios that have been classified as unavoidable may not be selected for use in calculation of an overall safety metric for an autonomous vehicle. This avoids the overall safety metric being unduly compromised based on scenarios for which there is no reasonable possibility of an autonomous vehicle avoiding a proximity event. Scenarios filtered using the avoidability metric and likeliness metric as described may also be used to test machine learning models and provide an indication of the suitability or effectiveness of such models.

In further examples wherein a trend of the metrics across multiple iterations of a simulation is determined, this trend may be used to monitor performance of different versions of control systems being used in the respective simulations—improved metrics may represent an improvement in the control systems of the autonomous vehicle being simulated.

Figure 5:
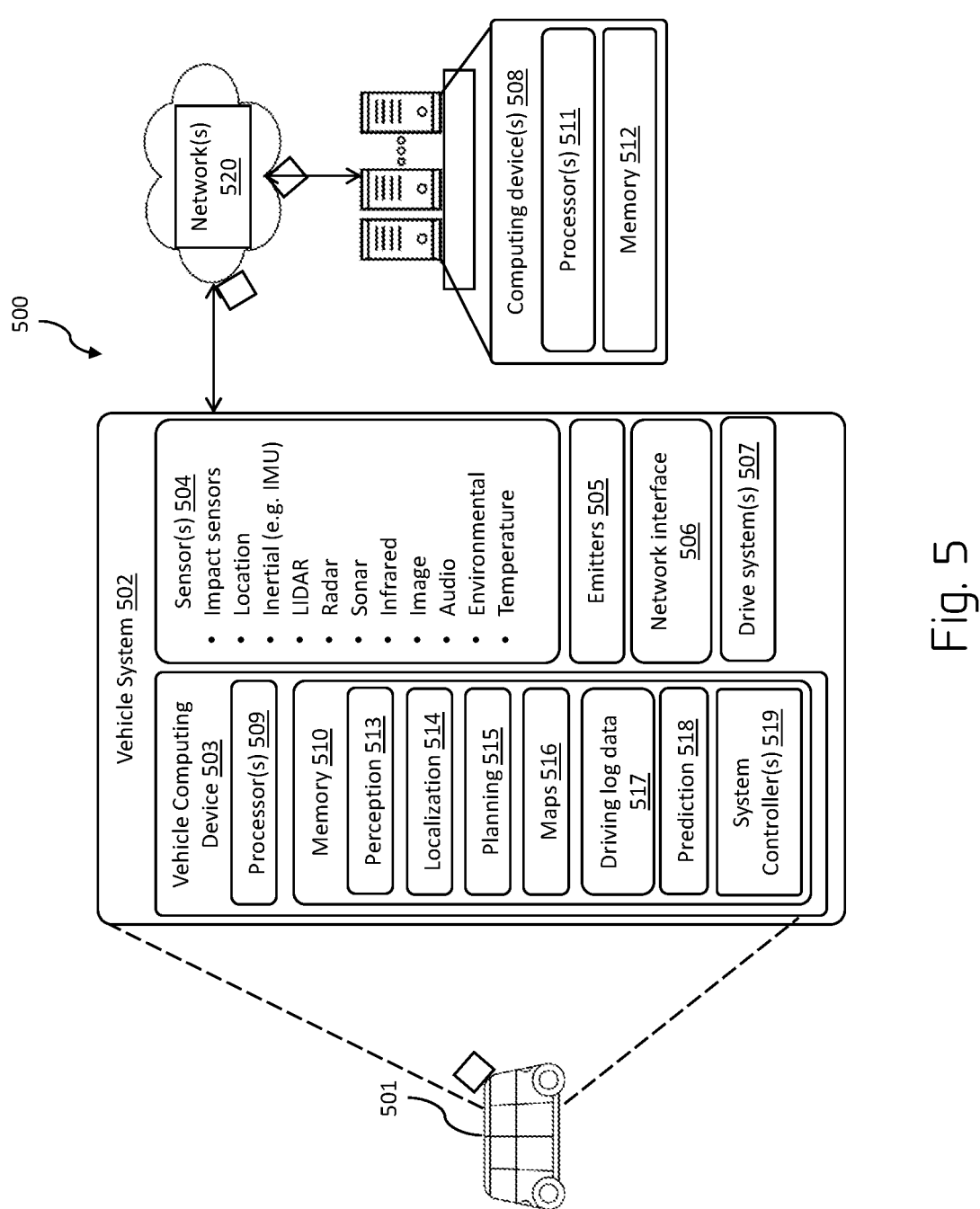
FIG. 5 is a block diagram of an example system for implementing the techniques described herein.

FIG. 5 illustrates a block diagram of a further example system 500 that is suitable for implementing the techniques discussed herein. FIG. 5 may represent vehicle system 102 and computing device(s) 108 of FIG. 1. In some instances, the example system 500 may include a vehicle 502, which may represent the vehicle 101 in FIG. 1.

The vehicle 501 may include a vehicle computing device(s) 503, sensor(s) 504, emitter(s) 505, network interface(s) 506, and/or drive system(s) 507. Sensor(s) 504 may represent sensor(s) 105. The system 500 may additionally or alternatively comprise computing device(s) 508.

In some instances, the sensor(s) 504 may represent sensor(s) 105 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 504 may include multiple instances of each of these or other types of sensors. For instance, the radar sensors may include individual radar sensors located at the corners, front, back, sides, and/or top of the vehicle 501. As another example, the cameras may include multiple cameras disposed at various locations about the exterior and/or interior of the vehicle 501. The sensor(s) 504 may provide input to the vehicle computing device(s) 503 and/or to computing device(s) 508.

The vehicle 501 may also include emitter(s) 505 for emitting light and/or sound, as described above. The emitter(s) 505 may include interior audio and visual emitter(s) to communicate with passengers of the vehicle 501. Interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 505 may also include exterior emitter(s). Exterior emitter(s) may include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 501 may also include network interface(s) 506 that enable communication between the vehicle 501 and one or more other local or remote computing device(s). The network interface(s) 506 may facilitate communication with other local computing device(s) on the vehicle 501 and/or the drive system(s) 507. The network interface(s) 506 may additionally or alternatively allow the vehicle to communicate with other nearby computing device(s) (e.g., other nearby vehicles, traffic signals, etc.). The network interface(s) 506 may additionally or alternatively enable the vehicle 501 to communicate with computing device(s) 508 over a network 520. In some examples, computing device(s) 508 may comprise one or more nodes of a distributed computing system (e.g., a cloud computing architecture).

The vehicle 501 may include one or more drive systems 507. In some instances, the vehicle 501 may have a single drive system 507. In some instances, the drive system(s) 507 may include one or more sensors to detect conditions of the drive system(s) 507 and/or the surroundings of the vehicle 501. By way of example and not limitation, the sensor(s) of the drive system(s) 507 may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 507. In some cases, the sensor(s) on the drive system(s) 507 may overlap or supplement corresponding systems of the vehicle 501 (e.g., sensor(s) 504).

The drive system(s) 507 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 507 may include a drive system controller which may receive and preprocess data from the sensor(s) and to control operation of the various vehicle systems. In some instances, the drive system controller may include one or more processors and memory communicatively coupled with the one or more processors. The memory may store one or more components to perform various functionalities of the drive system(s) 507. Furthermore, the drive system(s) 507 may also include one or more communication connection(s) that enable communication by the respective drive system with one or more other local or remote computing device(s).

The vehicle computing device(s) 503 may include processor(s) 509 and memory 510 communicatively coupled with the one or more processors 509. Computing device(s) 508 may also include processor(s) 511, and/or memory 536. The processor(s) 509 and/or 511 may be any suitable processor capable of executing instructions to process data and perform operations as described herein. By way of example and not limitation, the processor(s) 509 and/or 511 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 510 and/or 512 may be examples of non-transitory computer-readable media. The memory 510 and/or 512 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 510 and/or memory 512 may store a perception component 513, localization component 514, planning component 515, map(s) 516, driving log data 517, prediction component 518, and/or system controller(s) 519—zero or more portions of any of which may be hardware, such as GPU(s), CPU(s), and/or other processing units.

The perception component 513 may detect object(s) in in an environment surrounding the vehicle 501 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 513 is referred to as perception data. The perception component 513 may be configured to associate a bounding region (or other indication) with an identified object. The perception component 513 may be configured to associate a confidence score associated with a classification of the identified object with an identified object. In some examples, objects, when rendered via a display, can be colored based on their perceived class. The object classifications determined by the perception component 513 may distinguish between different object types such as, for example, a passenger vehicle, a pedestrian, a bicyclist, motorist, a delivery truck, a semi-truck, traffic signage, and/or the like.

In at least one example, the localization component 514 may include hardware and/or software to receive data from the sensor(s) 504 to determine a position, velocity, and/or orientation of the vehicle 501 (e.g., one or more of an x-, y-, z-position, roll, pitch, or yaw). For example, the localization component 514 may include and/or request/receive map(s) 516 of an environment and can continuously determine a location, velocity, and/or orientation of the autonomous vehicle 501 within the map(s) 516. In some instances, the localization component 514 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 514 may provide data to various components of the vehicle 501 to determine an initial position of an autonomous vehicle for generating a trajectory and/or for generating map data, as discussed herein. In some examples, localization component 514 may provide, to the perception component 513, a location and/or orientation of the vehicle 501 relative to the environment and/or sensor data associated therewith.

The planning component 515 may receive a location and/or orientation of the vehicle 501 from the localization component 514 and/or perception data from the perception component 513 and may determine instructions for controlling operation of the vehicle 501 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 519 and/or drive system(s) 507 may parse/cause to be carried out, second instructions for the emitter(s) 505 may be formatted according to a second format associated therewith).

The driving log data 517 may comprise sensor data, perception data, and/or scenario labels collected/determined by the vehicle 501 (e.g., by the perception component 513), as well as any other message generated and or sent by the vehicle 501 during operation including, but not limited to, control messages, error messages, etc. In some examples, the vehicle 501 may transmit the driving log data 517 to the computing device(s) 508. The computing device(s) 508 may identify one or more scenarios based at least in part on the log data, which may also comprise defining a scenario, wherein the scenarios are used to generate a playback simulation. For example, the computing device(s) 508 may determine an environmental layout, a number, type, and a configuration of object(s) in the environment and/or associate this definition with one or more portions of log data associated with that scenario. In some examples, the driving log data 517 may comprise (historical) perception data that was generated on the vehicle 501 during operation of the vehicle.

The prediction component 518 may generate one or more probability maps representing prediction probabilities of possible locations of one or more objects in an environment. For example, the prediction component 518 may generate one or more probability maps for vehicles, pedestrians, animals, and the like within a threshold distance from the vehicle 501. In some examples, the prediction component 518 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment. In some examples, the planner component 515 may be communicatively coupled to the prediction component 518 to generate predicted trajectories of objects in an environment. For example, the prediction component 518 may generate one or more predicted trajectories for objects within a threshold distance from the vehicle 501. In some examples, the prediction component 518 may measure a trace of an object and generate a trajectory for the object based on observed and predicted behavior. Although prediction component 518 is shown on a vehicle 501 in this example, the prediction component 518 may also be provided elsewhere, such as in a remote computing device as shown in FIG. 3. In some embodiments, a prediction component may be provided at both a vehicle and a remote computing device. These components may be configured to operate according to the same or a similar algorithm.

The memory 510 and/or 512 may additionally or alternatively store a mapping system, a planning system, a ride management system, etc. Although perception component 513 and/or planning component 515 are illustrated as being stored in memory 510, perception component 513 and/or planning component 515 may include processor-executable instructions, machine-learned model(s) (e.g., a neural network), and/or hardware.

As described herein, the localization component 514, the perception component 513, the planning component 515, and/or other components of the system 500 may comprise one or more ML models. For example, the localization component 514, the perception component 513, and/or the planning component 515 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 514 may additionally or alternatively store one or more system controller(s) 519, which may be configured to control steering, propulsion, braking, safety, emitters, communication, and other systems of the vehicle 501. These system controller(s) 519 may communicate with and/or control corresponding systems of the drive system(s) 507 and/or other components of the vehicle 501.

It should be noted that while FIG. 5 is illustrated as a distributed system, in alternative examples, components of the vehicle 501 may be associated with the computing device(s) 508 and/or components of the computing device(s) 508 may be associated with the vehicle 501. That is, the vehicle 501 may perform one or more of the functions associated with the computing device(s) 508, and vice versa.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Many variations and modifications may be made to the above-described examples, the elements of which are to be understood as being among other acceptable examples. All such modifications and variations are intended to be included herein within the scope of this disclosure and protected by the following claims.

EXAMPLE CLAUSES

A: A system comprising: one or more processors; and a non-transitory memory storing processor-executable instructions that, when executed by the one or more processors, cause the system to perform actions including: accessing a driving log comprising real perception data of a driving scenario within a physical environment; generating a simulation based at least in part on the driving scenario in the driving log, the simulation comprising a simulated autonomous vehicle in a simulated environment wherein the simulated autonomous vehicle is controlled in the simulation by a control code portion and at least one simulated agent vehicle controlled at least in part by data from the driving log in the simulated environment; identifying a portion of the simulation wherein the simulated autonomous vehicle has a proximity event with a simulated agent vehicle in a proximity zone; and determining, for the portion of the simulation: a first deceleration that would be required by the simulated agent vehicle to avoid the proximity event; a first value for a first metric representative of the first deceleration; a second deceleration that would be required by the simulated autonomous vehicle to avoid the proximity event; a second value for a second metric representative of an inverse of the second deceleration; a classification of the proximity event as an avoidable or an unavoidable event based on the first value and the second value.

B: A system according to Clause A, wherein the first deceleration is determined at a time that the simulated autonomous vehicle is on course to occupy the proximity zone; and the second deceleration is determined at a time that the simulated agent vehicle is on course to occupy the proximity zone.

C: A system according to Clause B, wherein the time that the simulated autonomous vehicle is on course to occupy the proximity zone, and the time that the simulated agent vehicle is on course to occupy the proximity zone are each determined using at least one of a respective: longitudinal intent time; and lateral intent time.

D: A system according to Clause C, wherein the longitudinal intent time comprises a first time at which an entity's speed indicates intent to occupy the proximity zone, calculated based on a predetermined rate of deceleration; and wherein the lateral intent time comprises a first time at which it is clear the entity's path will lead to the proximity zone.

E: A method comprising: accessing a driving log comprising real perception data determined for a physical environment; generating a simulation based at least in part on the driving log, the simulation comprising a simulated autonomous vehicle in a simulated environment and a plurality of simulated agent vehicles in the simulated environment;

identifying a portion of the simulation wherein the simulated autonomous vehicle has a proximity event with at least one simulated agent vehicle; determining, for the portion of the simulation, at least one of: a first metric representative of a likeliness of the proximity event occurring; and a second metric representative of an ability of the simulated autonomous vehicle to avoid the proximity event; classifying, for the portion of the simulation and based on the at least one metric, the proximity event as an avoidable or an unavoidable event.

F: A method according to Clause E, wherein the first metric comprises a measure of a first deceleration required by the simulated agent vehicle to avoid the proximity event at a time that the simulated autonomous vehicle is on course to occupy a proximity zone where the proximity event occurs; and wherein: the second metric comprises a measure of an inverse of a second deceleration that would be required by the simulated autonomous vehicle to avoid the proximity event at a time that the simulated agent vehicle is on course to occupy the proximity zone where the proximity event occurs.

G: A method according to Clause F, wherein the time that the simulated autonomous vehicle is on course to occupy the proximity zone, and the time that the simulated agent vehicle is on course to occupy the proximity zone are each determined using at least one of a respective: longitudinal intent time; and lateral intent time.

H: A method according to Clause G, wherein the longitudinal intent time comprises the first time at which an entity's speed indicates intent to occupy the proximity zone, calculated based on a predetermined rate of deceleration; and wherein the lateral intent time comprises the first time at which it is clear the entity's path will lead to the proximity zone.

I: A method according to Clause H, wherein the predetermined rate of deceleration is one of several predetermined rates of deceleration each corresponding to a respective category of the agent.

J: A method according to Clause I, wherein the category comprises one of: car; large vehicle; motorcycle; aircraft; vehicle with towed load; bicycle; animal; and pedestrian.

K: A method according to Clause F, wherein the first metric is determined by generating one or more further simulations in which the simulated agent decelerates at different times in order to determine a latest time at which the proximity event is avoided.

L: A method according to Clause F, wherein the second metric is determined by generating one or more further simulations in which the simulated autonomous vehicle decelerates at different times in order to determine a latest time at which the proximity event is avoided.

M: A method according to any of Clauses E to L, further comprising training a machine learning model using at least one data item from a driving log in a case that the proximity event is classified as an avoidable proximity event.

N: A method according to any of Clauses E to M, further comprising ranking a plurality of proximity events according to at least one of respective first or second metrics.

O: A method according to Clause M, further comprising selecting at least one proximity event of the plurality of proximity events for use in evaluating at least one machine learning model, based at least in part on at least one of: the respective first metric; the respective second metric; a position of the at least one proximity events within the ranking of the plurality of proximity events; and the classification of the proximity event as avoidable or unavoidable.

P: A method according to any of Clauses E to O, further comprising determining a trend across the plurality of simulations according to respective first and second metrics.

Q: One or more non-transitory computer-readable media storing instructions executable by one or more processors, wherein the instructions, when executed, cause the one or more processors to perform operations comprising: accessing a driving log comprising real perception data determined for a physical environment; generating a simulation based at least in part on the driving log, the simulation comprising a simulated autonomous vehicle in a simulated environment and a plurality of simulated agent vehicles in the simulated environment; identifying a portion of the simulation wherein the simulated autonomous vehicle has a proximity event with at least one simulated agent vehicle; determining, for the portion of the simulation, at least one of: a first metric representative of a likeliness of the proximity event occurring; and a second metric representative of an ability of the simulated autonomous vehicle to avoid the proximity event; classifying, for the portion of the simulation and based on the at least one metric, the proximity event as an avoidable or an unavoidable event.

R: One or more non-transitory computer-readable media according to Clause Q, wherein the first metric comprises a measure of a first deceleration required by the simulated agent vehicle to avoid the proximity event at a time that the simulated autonomous vehicle is on course to occupy a proximity zone where the proximity event occurs; and wherein: the second metric comprises a measure of an inverse of a second deceleration that would be required by the simulated autonomous vehicle to avoid the proximity event at a time that the simulated agent vehicle is on course to occupy the proximity zone where the proximity event occurs.

S: One or more non-transitory computer-readable media according to Clause R, wherein the time that the simulated autonomous vehicle is on course to occupy the proximity zone, and the time that the simulated agent vehicle is on course to occupy the proximity zone are each determined using at least one of a respective: longitudinal intent time; and lateral intent time.

T: One or more non-transitory computer-readable media according to Clause S, wherein the longitudinal intent time comprises the first time at which an entity's speed indicates intent to occupy the proximity zone, calculated based on a predetermined rate of deceleration; and wherein the lateral intent time comprises the first time at which it is clear the entity's path will lead to the proximity zone.

While the example clauses described above are described with respect to one particular implementation, it should be understood that, in the context of this document, the content of the example clauses can also be implemented via a method, device, system, computer-readable medium, and/or another implementation. Additionally, any of examples A-S may be implemented alone or in combination with any other one or more of the examples A-S.

What is claimed is:
1. A system comprising:
one or more processors; and
non-transitory memory storing processor-executable instructions that, when executed by the one or more processors, cause the system to perform actions including:
accessing a driving log comprising real perception data of a driving scenario within a physical environment;
generating a simulation based at least in part on the driving scenario in the driving log, the simulation comprising a simulated autonomous vehicle in a simulated environment, the simulated autonomous vehicle being controlled in the simulation by a control code portion, and at least one simulated agent vehicle controlled at least in part by data from the driving log in the simulated environment;

identifying a portion of the simulation wherein the simulated autonomous vehicle has a proximity event with a simulated agent vehicle in a proximity zone; and determining, for the portion of the simulation:

a first deceleration that would be required by the simulated agent vehicle to avoid the proximity event;

a first value for a first metric representative of the first deceleration;

a second deceleration that would be required by the simulated autonomous vehicle to avoid the proximity event;

a second value for a second metric representative of a reciprocal of the second deceleration; and a classification of the proximity event as an avoidable or an unavoidable event based on the first value and the second value.

2. The system of claim 1, wherein the first deceleration is determined at a time that the simulated autonomous vehicle is on course to occupy the proximity zone; and the second deceleration is determined at a time that the simulated agent vehicle is on course to occupy the proximity zone.

3. The system of claim 2, wherein the time that the simulated autonomous vehicle is on course to occupy the proximity zone, and the time that the simulated agent vehicle is on course to occupy the proximity zone are each determined using at least one of a respective:

longitudinal intent time; and lateral intent time.

4. The system of claim 3, wherein the longitudinal intent time comprises a first time at which an entity's speed indicates intent to occupy the proximity zone, calculated based on a predetermined rate of deceleration; and wherein the lateral intent time comprises a first time at which it is clear the entity's path will lead to the proximity zone.

5. A method comprising:

accessing a driving log comprising real perception data determined for a physical environment;

generating a simulation based at least in part on the driving log, the simulation comprising a simulated autonomous vehicle in a simulated environment and a plurality of simulated agent vehicles in the simulated environment;

identifying a portion of the simulation wherein the simulated autonomous vehicle has a proximity event with at least one simulated agent vehicle;

determining, for the portion of the simulation:

a first metric representative of a likeliness of the proximity event occurring; and a second metric representative of a reciprocal of a deceleration that would be required by the simulated autonomous vehicle to avoid the proximity event; and classifying, for the portion of the simulation and based on at least the second metric, the proximity event as an avoidable or an unavoidable event.

6. The method of claim 5, wherein:

the first metric comprises a measure of a first deceleration required by the simulated agent vehicle to avoid the proximity event at a time that the simulated autonomous vehicle is on course to occupy a proximity zone where the proximity event occurs;

and wherein:

the second metric comprises a measure of an inverse of a second deceleration that would be required by the simulated autonomous vehicle to avoid the proximity event at a time that the simulated agent vehicle is on course to occupy the proximity zone where the proximity event occurs.

7. The method of claim 6, wherein the time that the simulated autonomous vehicle is on course to occupy the proximity zone, and the time that the simulated agent vehicle is on course to occupy the proximity zone are each determined using at least one of a respective:

longitudinal intent time; and lateral intent time.

8. The method of claim 7, wherein the longitudinal intent time comprises the first time at which an entity's speed indicates intent to occupy the proximity zone, calculated based on a predetermined rate of deceleration; and wherein the lateral intent time comprises the first time at which it is clear the entity's path will lead to the proximity zone.

9. The method of claim 8, wherein the predetermined rate of deceleration is one of several predetermined rates of deceleration each corresponding to a respective category of the agent.

10. The method of claim 9, wherein the category comprises one of:

Car;

Large vehicle;

Motorcycle;

Aircraft;

Vehicle with towed load;

Bicycle;

Animal; and

Pedestrian.

11. The method of claim 6, wherein the first metric is determined by generating one or more further simulations in which the simulated agent decelerates at different times in order to determine a latest time at which the proximity event is avoided.

12. The method of claim 6, wherein the second metric is determined by generating one or more further simulations in which the simulated autonomous vehicle decelerates at different times in order to determine a latest time at which the proximity event is avoided.

13. The method of claim 5, further comprising training a machine learning model using at least one data item from a driving log in a case that the proximity event is classified as an avoidable proximity event.

14. The method of claim 5, further comprising ranking a plurality of proximity events according to at least one of respective first or second metrics.

15. The method of claim 13, further comprising selecting at least one proximity event of the plurality of proximity events for use in evaluating at least one machine learning model, based at least in part on at least one of:

the respective first metric;

the respective second metric a position of the at least one proximity events within the ranking of the plurality of proximity events; and the classification of the proximity event as avoidable or unavoidable.

16. The method of claim 5, further comprising determining a trend across the plurality of simulations according to respective first and second metrics.

17. One or more non-transitory computer-readable media storing instructions executable by one or more processors, wherein the instructions, when executed, cause the one or more processors to perform operations comprising:

accessing a driving log comprising real perception data determined for a physical environment;

generating a simulation based at least in part on the driving log, the simulation comprising a simulated autonomous vehicle in a simulated environment and a plurality of simulated agent vehicles in the simulated environment;

identifying a portion of the simulation wherein the simulated autonomous vehicle has a proximity event with at least one simulated agent vehicle;

determining, for the portion of the simulation:

a first metric representative of a likeliness of the proximity event occurring; and a second metric representative of a reciprocal of a deceleration that would be required by the simulated autonomous vehicle to avoid the proximity event; and classifying, for the portion of the simulation and based on at least the second metric, the proximity event as an avoidable or an unavoidable event.

18. The non-transitory computer-readable media of claim 17, wherein:

the first metric comprises a measure of a first deceleration required by the simulated agent vehicle to avoid the proximity event at a time that the simulated autonomous vehicle is on course to occupy a proximity zone where the proximity event occurs;

and wherein:

the second metric comprises a measure of an inverse of a second deceleration that would be required by the simulated autonomous vehicle to avoid the proximity event at a time that the simulated agent vehicle is on course to occupy the proximity zone where the proximity event occurs.

19. The non-transitory computer-readable media of claim 18, wherein the time that the simulated autonomous vehicle is on course to occupy the proximity zone, and the time that the simulated agent vehicle is on course to occupy the proximity zone are each determined using at least one of a respective:

longitudinal intent time; and lateral intent time.

20. The non-transitory computer-readable media of claim 19, wherein the longitudinal intent time comprises the first time at which an entity's speed indicates intent to occupy the proximity zone, calculated based on a predetermined rate of deceleration; and wherein the lateral intent time comprises the first time at which it is clear the entity's path will lead to the proximity zone.

* * * * *